(12) United States Patent
Mishra et al.

(10) Patent No.: US 11,829,475 B2
(45) Date of Patent: Nov. 28, 2023

(54) HARDWARE-ASSISTED MALWARE DETECTION USING EXPLAINABLE MACHINE LEARNING

(71) Applicant: University of Florida Research Foundation, Inc., Gainesville, FL (US)

(72) Inventors: Prabhat Kumar Mishra, Gainesville, FL (US); Zhixin Pan, Gainesville, FL (US); Jennifer M. Sheldon, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 135 days.

(21) Appl. No.: 17/500,016

(22) Filed: Oct. 13, 2021

(65) Prior Publication Data
US 2022/0121744 A1    Apr. 21, 2022

Related U.S. Application Data

(60) Provisional application No. 63/094,000, filed on Oct. 20, 2020.

(51) Int. Cl.
*G06F 21/56* (2013.01)
*G06N 3/04* (2023.01)
(Continued)

(52) U.S. Cl.
CPC ........ *G06F 21/567* (2013.01); *G06F 18/2433* (2023.01); *G06F 21/566* (2013.01); *G06F 21/577* (2013.01); *G06N 3/04* (2013.01)

(58) Field of Classification Search
CPC .... G06F 21/567; G06F 21/566; G06F 21/577; G06F 21/50; G06F 21/52; G06F 21/552; G06F 21/554; G06F 21/56
See application file for complete search history.

(56) References Cited

U.S. PATENT DOCUMENTS 9,690,938 B1 * 6/2017 Saxe .................. G06N 3/045

OTHER PUBLICATIONS

Mathew Ashik et al. "Detection of Malicious Software by Analyzing Distinct Artifacts Using Machine Learning and Deep Learning Algorithms". Electronics. 10, 1694, 28 pages. 2021.
(Continued)

*Primary Examiner* — Edward Zee
(74) *Attorney, Agent, or Firm* — Thomas Horstemeyer LLP

(57) ABSTRACT

The present disclosure describes systems and methods for hardware-assisted malware detection. One such system comprises a memory; and a hardware processor of a computing device operatively coupled to the memory. The hardware processor is configured to execute a software application suspected of being malware; monitor behavior of the software application at run-time; and acquire an input time sequence of data records based on a trace analysis of the software application, wherein the input time sequence comprises a plurality of features of the software application. The hardware processor is further configured to classify the software application as being a malicious software application based on the plurality of features of the software application; and output a ranking of a subset plurality of features by their respective contributions towards the classification of the software application as being malicious software.

20 Claims, 14 Drawing Sheets

(51) Int. Cl.
  *G06F 18/2433*  (2023.01)
  *G06F 21/57*  (2013.01)
  *G06F 21/00*  (2013.01)

(56) References Cited

OTHER PUBLICATIONS

Kanad Basu et al. "PREEMPT: PReempting Malware by Examining Embedded Processor Traces". Proceedings of the 56th Annual Design Automation Conference. 6 pages. 2019.

Dragos Gavrilut et al. "Malware Detection Using Machine Learning". Proceedings of the International Multiconference on Computer Science and Information Technology. vol. 4. pp, 735-741. 2009.

Martin Kinkead et al. ScienceDirect. Procedia Computer Science. vol. 184, pp. 959-965. 2021.

Andreas Moser et al. "Limits of Static Analysis for Malware Detection". IEEE Computer Society. 23rd Annual Computer Security Applications Conference. pp. 421-430. 2007.

Joshua Saxe et al. "Deep Neural Network Based Malware Detection Using Two Dimensional Binary Program Features". IEEE 10th International Conference on Malicious and Unwanted Software: "Know Your Enemy" (Malware). pp. 11-20. 2015.

Jagsir Singh et al. "A survey on machine learning-based mal vare detection in executable files". Journal of Systems Architecture. vol. 112. pp. 1-24. 2021.

Xueyang Wang et al. "Hardware Performance Counter-Based Malware Identification and Detection with Adaptive Compressive Sensing". ACM Transactions on Architecture and Code Optimization. vol. 13, No. 1, pp. 3:1-3:23. Mar. 2016.

Ilsun You et al. "Malware Obfuscation Techniques: A Brief Survey". IEEE Computer Society. International Conference on Broadband, Wireless Computing, Communication and Applications. pp. 297-300. 2010.

* cited by examiner

|  | Business Disruption | Information Loss | Revenue Loss | Equipment Damage | Total Cost by Attack Type |
|---|---|---|---|---|---|
| Malware (+11%) | $0.50 | $1.40 | $0.60 | $0.10 | $2.60 |
| Web-Based Attacks (+17%) | $0.30 | $1.40 | $0.60 | xx | $2.30 |
| Denial-of-Service (+10%) | $1.10 | $0.20 | $0.40 | $0.10 | $1.70 |
| Malicious Insiders (+15%) | $0.60 | $0.60 | $0.30 | $0.10 | $1.60 |
| Phishing and Social Engineering (+8%) | $0.40 | $0.70 | $0.30 | xx | $1.40 |
| Malicious Code (+9%) | $0.20 | $0.90 | $0.20 | xx | $1.40 |
| Stolen Devices (+12%) | $0.40 | $0.40 | $0.10 | $0.10 | $1.00 |
| Ransomware (+21%) | $0.20 | $0.30 | $0.10 | $0.10 | $0.70 |
| Botnets (+12%) | $0.10 | $0.20 | $0.10 | xx | $0.40 |
| Total Cost by Consequence | $4.00 | $5.90 | $2.60 | $0.50 | $13.00 |

FIG. 1

|       | $C_1$ | $C_2$ | $C_3$ | $C_4$ | $C_5$ | $C_6$ | $C_7$ |
|-------|-------|-------|-------|-------|-------|-------|-------|
| $R_1$ | 8ca0  | bc00  | 1886  | 8ca0  | a68c  | c401  | e401  |
| $R_2$ | a2c2  | 08b4  | a6ab  | e6a2  | 0004  | 88fd  | b422  |
| $R_3$ | b485  | ec00  | 28d4  | 2101  | 506c  | 02f0  | 02e2  |
| $R_4$ | 8c21  | 6002  | d201  | 90c4  | 02f9  | 90a2  | 0048  |
| ⋮     |       |       |       |       |       |       |       |

⇒

| 0.003 | 0.028 | 0.073 | 0.431 | 0.136 | 0.288 | 0.001 |
|-------|-------|-------|-------|-------|-------|-------|

FIG. 9

HARDWARE-ASSISTED MALWARE DETECTION USING EXPLAINABLE MACHINE LEARNING

CROSS-REFERENCE TO RELATED APPLICATION

This application claims priority to co-pending U.S. provisional application entitled, "Hardware-Assisted Malware Detecting Using Explainable Machine Learning," having Ser. No. 63/094,000, filed Oct. 20, 2020, which is entirely incorporated herein by reference.

STATEMENT REGARDING FEDERALLY SPONSORED RESEARCH OR DEVELOPMENT

This invention was made with government support under 1908131 awarded by National Science Foundation. The government has certain rights in the invention.

BACKGROUND

Malicious software, popularly known as malware, is widely acknowledged as a serious threat to modern computing systems. Software-based solutions, such as anti-virus software (AVS), are not effective since they rely on matching patterns that can be easily fooled by carefully crafted malware with obfuscation or other deviation capabilities. While recent malware detection methods provide promising results through effective utilization of hardware features, the detection results cannot be interpreted in a meaningful way.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 shows a table of consequences of different types of cyberattacks in 2018.

FIG. 9 illustrates an interpretation of a BASHLITE client's traced signals that indicate a clock cycle of malicious behavior in accordance with the present disclosure.

DETAILED DESCRIPTION

Figure 2:
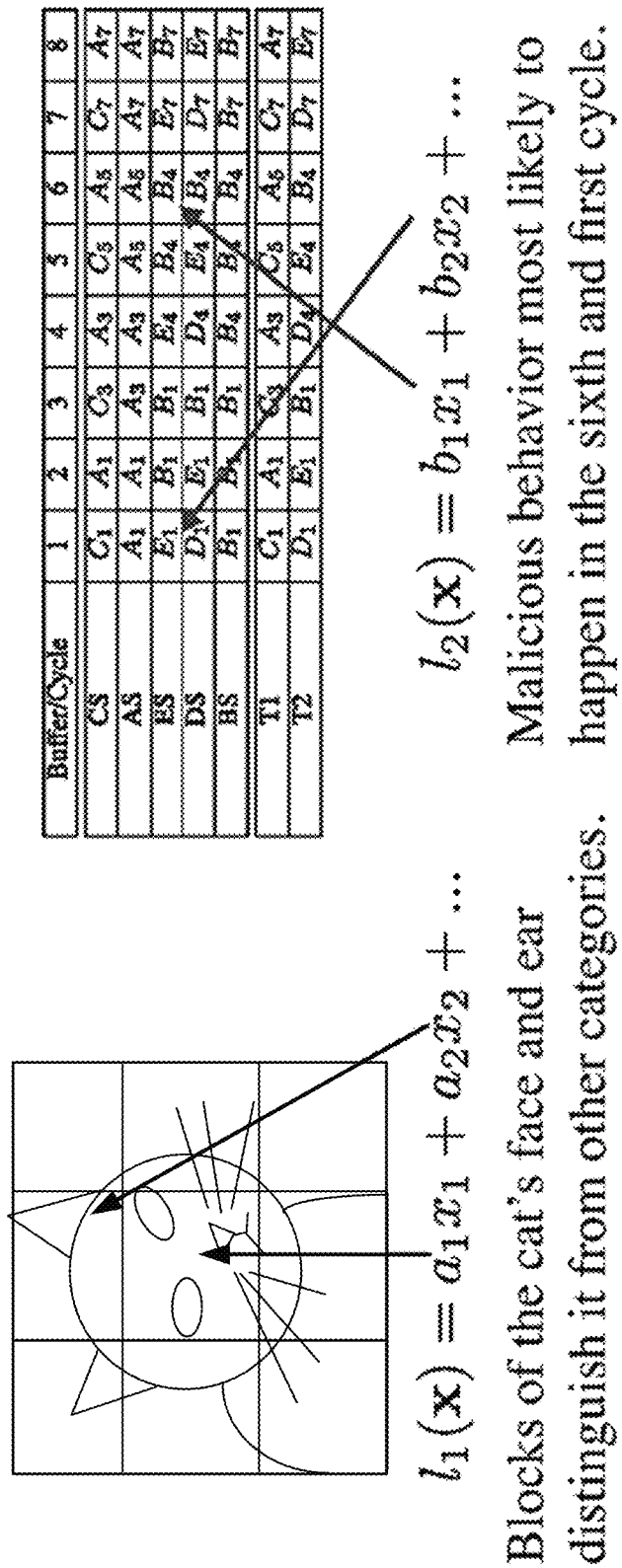
FIG. 2 shows an interpretation of classification results in image recognition and identification of malicious behavior using clock cycles in accordance with the present disclosure.

The present disclosure describes various embodiments of systems, apparatuses, and methods for hardware-assisted malware detection using explainable machine learning. Such systems and methods provide interpretable explanations for classification results to address the challenge of transparency, in which an explainable outcome can lead to accurate localization of malicious behavior. Experimental evaluation using a wide variety of real-world malware datasets demonstrates that an exemplary hardware-assisted malware detection framework can produce accurate and human-understandable malware detection results with provable guarantees.

Malicious software (malware) is any software designed to harm a computer, server, or computer network and cause severe damage to the target system. The portability of malware also enables the malicious software to proliferate across various platforms at an alarming rate. Especially with the rapid development of Internet and smart phones in recent years, malware-implanted applications provided by third-party developers expose embedded systems to a great threat of privacy leakage due to their open source nature. FIG. 1 shows the results of a recent cybercrime study involving 355 companies across 11 countries covering 16 industrial sectors in 2018. The figure highlights that malware is the most expensive attack for organizations, with an average revenue loss of $2.6 million per organization in 2018 (11% increase compared to 2017). See Kelly Bissell and Larry Ponemon, "The Cost of Cybercrime: The Ninth Annual Cost of Cybercrime Research" (2019). Clearly, there is an urgent need to develop efficient malware detection techniques.

Correspondingly, malware detection is a "cat and mouse" game where researchers design novel methods for malware detection, and attackers develop devious ways to circumvent detection. The arms race between malware attacks and malware detection has been going on for more than two decades. In the early days, the focus of detection was on static analysis. The basic idea of static analysis is to utilize software filters for malware detection by extracting feature signatures by either a machine learning algorithm or human expert knowledge. Accordingly, signature-based detection is one of the most popular commercial malware detection techniques, in which signature-based detectors compare the signature of a program executable with previously stored malware signatures. However, signature-based anti-virus software (AVS) is not useful for unknown zero-delay malware since the respective signature is absent from the database. Additionally, this naive approach can be circumvented by obfuscation. For example, signature-based AVS is not effective even for known malware with polymorphic or metamorphic features. Such morphic malware has either a mutation engine or is capable of rewriting itself in each iteration through various program obfuscation techniques.

Dynamic detection techniques try to defend against obfuscation. Instead of struggling with concealing strings created by obfuscation, such methods keep track of the runtime behavior of software and analyze and report any malicious behavior such as illegal access. While behavior-based AVS is promising in detecting unknown and morphing malware, it is computation intensive. As a result, behavior-based AVS is not suitable for resource-constrained systems, such as IoT (Internet of Things) edge devices that operate under real-time, power, and energy constraints. Moreover, both static and dynamic detection methods run on the software level. AVS is unable to detect malware with obfuscation or other deviation capabilities, and malware can subvert AVS by abusing software vulnerabilities.

Recent research efforts explored designing hardware-assisted malware detection with the hardware as a root of trust due to their robust resistance against malware attacks compared to software-based detection. The underlying assumption is that, although AVS can be fooled by variations in malware code, it is difficult to subvert a hardware-based detector since the malware functionality will remain the same. There are some promising directions for hardware-assisted malware detection using embedded trace buffer (ETB), hardware performance counters (HPC), and design-for-debug structures.

For example, Petroni et al. introduced a Peripheral Component Interconnect (PCI) based detector that monitors immutable kernel memory and successfully detects various kernel-level rootkits. See Nick L. Petroni Jr., et al., "Copilot—A Coprocessor-Based Kernel Runtime Integrity Monitor," Proceedings of the 13th USENIX Security Symposium, pages 179-194 (2004). Since this PCI-based method relies on a physical memory address, it varies from run to run, which makes its performance unstable. Methods using Hardware Performance Counters (HPC) have also been proposed, but the shortcoming still exists, since HPCs involve unacceptably high false positive rates, along with expensive performance penalties incurred by HPC readings. Embedded Trace Buffer (ETB) based malware detection shows advantages over HPC based methods in terms of classification accuracy. For instance, PREEMPT utilizes the ETB, which gives a prediction accuracy as high as 94%. See Kanad Basu, et al., "PREEMPT: PReempting Malware by Examining Embedded Processor Traces," Proceedings of the 56th Annual Design Automation Conference (2019).

While hardware-based prediction is promising, it inherits three fundamental limitations: (1) These detection methods make prediction based on features collected from single cycles separately without considering the interaction between consecutive cycles. For malicious behaviors activated in consecutive time slots, it is hard to gather sufficient information; (2) Since execution of malware consists of both normal (benign) execution as well as malicious computation, the existing methods require expensive pre-processing to eliminate useless benign cycles; (3) Most importantly, a user gets only the final decision without understanding how the decision was made or where to locate the infected area, which can also lead to inaccurate predictions due to various factors including incorrect tracing, improper pre-processing, or erroneous machine learning algorithms.

Thus, despite all these advantages, exploiting hardware components for malware detection is still in its infancy—there is no strong theoretical basis. While machine learning has been successfully used for malware detection, none of the previous works on machine learning based malware detection are explainable. Therefore, the detection results cannot be interpreted in a meaningful way.

However, in accordance with the present disclosure, an exemplary system and method of hardware-assisted malware detection provides transparency in malware detection by providing interpretable explanations for classification results of benign and malicious programs. In one embodiment, an exemplary system/method interprets the outputs of a machine learning model with a ranking of contribution factors, which explicitly provides a detailed feature importance map and explains the internal mechanism of each individual prediction. Moreover, the present disclosure adopts the idea of long-short time memory (LSTM) that grants an exemplary machine learning model the ability to handle time-sequential data, which is crucial in collaborating with real-time hardware components.

As an overview, the demand for explainable machine learning has been steadily increasing ever since machine learning algorithms were widely adopted in many fields, especially in security domains. Specifically, in traditional machine learning frameworks, given an input sample $x=\{x_1, x_2, \ldots\}$, where $x_1, x_2, \ldots$ are feature components, a classifier C will assign an instance of x a label y to indicate its prediction. However, aside from the x to y mapping, no more useful information can be gathered from the system. Also, the whole framework acts like a black box lacking transparency, which is a fundamental obstacle for users to trust the results.

In accordance with the present disclosure, explanation schemes in machine learning can tackle the transparency issue by reasonably demonstrating the reason for predicting x as y. This task can be performed in multiple steps:
 (1) Select the useful features. For instance, in the case that x is the feature vector $\{x_1, x_2, \ldots\}$, the user needs to sieve out the useful features while eliminating redundant ones;
 (2) Sort the selected features ordered by their contribution towards the final decision;
 (3) Analyze values of top features with highest weights, and offer them as an human-understandable illustration. Based on the ranking status, a reasonable explanation for the behavior of classifiers can be provided.

The first step is devoted to useful feature selection and relies on a strategy known as Forward Propagation Based Methodology. Such a method starts with perturbing the inputs, and then observing the changes in outputs. The perturbation can be some random noise or pixels may be nullified for image-based tasks. If the perturbation failed to induce a relatively obvious difference in the output, these features can be considered as low-level contributors to the model. Therefore, they can be eliminated. Conversely, if a tiny change of a feature leads to a drastic difference in the prediction (output), the feature can be considered as a major contributor.

The second step focuses on sorting the features obtained in the first step. The features can be directly sorted by the magnitude of the incurred difference. However, a fundamental problem is how to accurately measure the difference. For image-based tasks, Frobenius norm is commonly applied. For distribution related work, KL (Kullback-Leibler) divergence is widely adopted. However, there is no such feasible measurement for tasks in a security domain. A more stable and accurate way is using gradient analysis, also called as Backward Propagation based Methodology, in which backward propagation based methods rank the importance of input features by leveraging their gradients.

Both backward and forward propagation methods are built based on a whitebox setting, where it is assumed that users possess full access to the structure, hyper parameter, and training data. However, the whitebox setting may not be suitable in many scenarios due to the privacy concern or computation costs for large-scale structures. In such scenarios, a blackbox setting is required. For example, Ribeiro et al. proposed a blackbox based algorithm that starts with randomly perturbing input x to generate a set of artificial samples $x_1$, $x_2$, $x_3$, etc. See Marco Túlio Ribeiro, et al., "Why Should I Trust You?": Explaining the Predictions of Any Classifier," Proceedings of the 22nd ACM SIGKDD International Conference on Knowledge Discovery and Data Mining (2016). These artificial samples are used by the machine learning model to obtain corresponding outputs $y_1$, $y_2$, $y_3$, etc. Next, a linear regression leads to a linear prediction model l such that y=l(x) fits the artificial dataset. Since a linear prediction model can always be expressed by a polynomial, the expression to extract weight information is utilized. For example, assuming we have $l(x)=a_1x_1+a_2x_2+a_3x_3+\ldots$ after computation, the terms are sorted by absolute value of their coefficients. For example, if $a_i$ is the largest coefficient in the term $a_ix_i$, the most important component is $x_i$.

The third step interprets the selected and sorted important features. A simple example in the computer vision domain is image recognition as shown in FIG. 2. By segmenting a given image into square sub-blocks, the explainable machine learning framework is able to sort the blocks by their contribution towards the classifier's output, so that it can illustrate what part from the given picture is able to distinguish it from other categories.

While the existing approaches are promising, they face two fundamental challenges in dealing with hardware-assisted malware detection. First, existing approaches consider input data that are static pixel images. However, malware detection needs to handle input data that are time-sequential records. Second, while linear regression can be used by existing methods, linear regression can lead to a serious accuracy loss when dealing with real datasets, since linear regression suffers from sensitivity to extreme values like isolation points. Even piece-wise linear regression may not work due to a high computation cost. To the best of our knowledge, an exemplary hardware-assisted malware detection approach, in accordance with embodiments of the present disclosure, is the first attempt in applying explainable machine learning for hardware-assisted malware detection.

An exemplary hardware-assisted malware detection approach enables a synergistic integration of hardware trace analysis and explainable machine learning for efficient malware detection. Existing design-for-debug architecture, such as an embedded trace buffer, can be utilized for trace collection. Such traces can be viewed as a ω×d table X, where ω is the width and d is the depth. The table represents the recorded values of ω traced signals over d clock cycles, in which each column is split as a single feature component, i.e. values of all traced signals within one single cycle. Then, explainable machine learning for malware detection can be applied.

Figure 3:
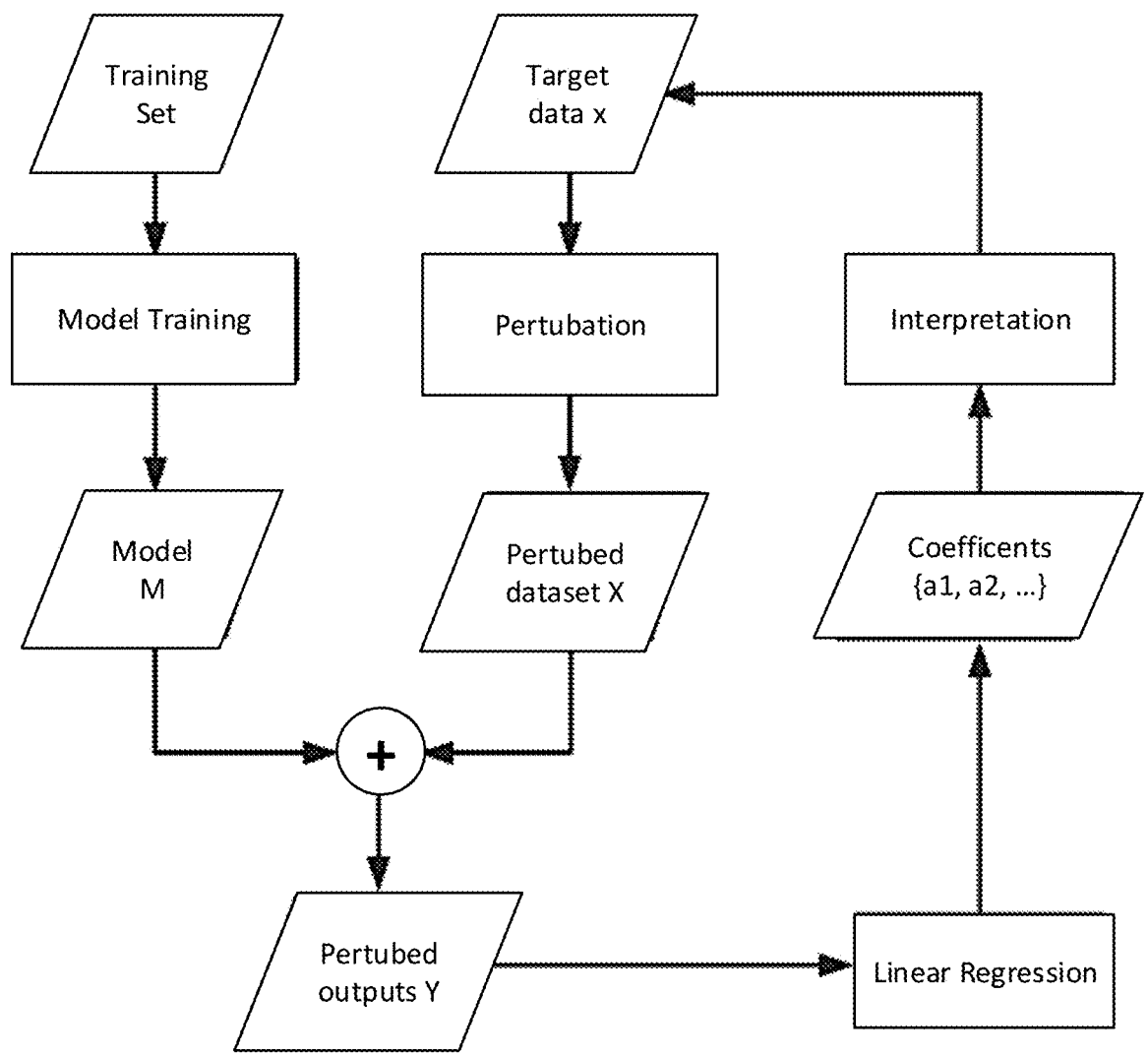
FIG. 3 shows an exemplary malware detection framework containing model training, perturbation, linear regression, and outcome interpretation in accordance with various embodiments of the present disclosure.

FIG. 3 shows an overview of an exemplary hardware-assisted malware detection method that contains four major tasks or activities: model training, perturbation, linear regression, and outcome interpretation, in accordance with various embodiments of the present disclosure. In brief, the first task is model training, where a machine learning classifier M is trained using collected traces. The second task performs perturbation. For an input instance x that we want to explain, x is randomly perturbed to generate an artificial input dataset $X=\{x_1, x_2, \ldots\}$. The artificial input dataset is fed to M to obtain corresponding model output $Y=\{M(x_1), M(x_2), \ldots\}$. In order to guarantee the accuracy of the subsequent regression algorithm, isolation points in Y can also be eliminated. The third task applies linear regression on X and Y to obtain a linear regression function. The goal of the fourth task is to perform outcome interpretation. Specifically, the top features ranked by a magnitude of coefficients will provide crucial timing information of malware. For example, FIG. 2 shows the most likely clock cycles when malicious behaviors occurred.

Regarding model training, hardware-assisted malware detection techniques monitors the behavior of software at run-time. Therefore, relying on single-cycle data is not effective since malicious behavior usually consumes several sequential cycles. Moreover, single-cycle based strategies are likely to mispredict a benign software as malicious due to the fact that malware also contains normal operations. Thus, considering these benign operations as important features of malware can lead to misclassification. A well-designed preprocessing strategy can mitigate the risk of misclassification by filtering overlapped common behaviors shared by both, but the difficulty of designing such a strategy is extremely high and there is no guarantee that it can be performed in all cases. Therefore, an exemplary machine learning model for the present disclosure should satisfy the following two properties: (1) Ability to accept time series type data as input; and (2) Ability to make decisions utilizing potential information concealed in consecutive adjacent inputs. Accordingly, exemplary embodiments utilize a Recurrent Neural Network (RNN) training to satisfy these properties, since RNN is powerful in handling sequential input data.

Figure 4:
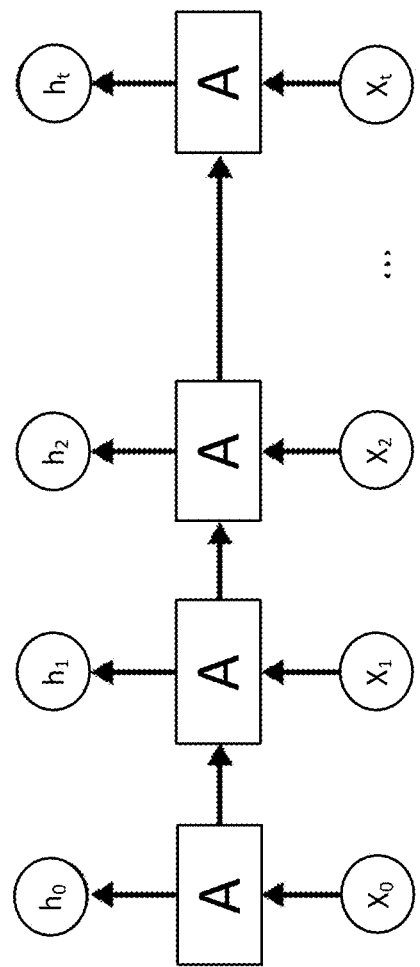
FIG. 4 shows a structure of a Recurrent Neural Network in accordance with the present disclosure.
Figure 4:
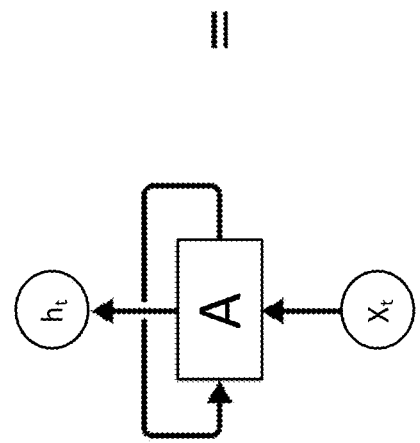

A classic structure of RNN is shown in FIG. 4. In the figure, A represents the neural network architecture, where $x_0$, $x_1$, $x_2$, ... represents the time series inputs and $h_i$s represent the outputs of hidden layers. As one can see from the left-side of the figure, instead of finishing the input-output mapping in one forward pass, the RNN accepts sequential inputs. For each single input $x_i$, RNN not only provides immediate response $h_i$, but also stores the information of the current input by updating the architecture itself. On the right-side of the figure, information corresponding to the previous step will also be fed into the architecture to supply extra information by unrolling the RNN structure. For trace-data-based malware detection, each column of a trace table can be set as inputs, and the hidden state of a final stage, i.e. $h_t$, can be set as the final output.

While RNN is suitable for handling time sequential data, it is not guaranteed to learn features from adjacent inputs. For time series inputs, considering inputs in groups and training the model to make decision based on co-occurrence of sequential features is crucial. Such training can be achieved by appending a penalty term to the loss function, in which the penalty term can force models to group adjacent elements together from an input feature map. The loss function with the penalty term for the RNN model (FIG. 4) can be written as:

$$J = \frac{1}{N}\sum_{i=1}^{N} L(A(x_i), y_i) + \frac{\lambda}{2}\sum_{k=1}^{t} \|h_i - h_{i-1}\|_{-1}\|$$

where A is the model, $x_i$ is a training sample, the label of $x_i$ is denoted as $y_i$, the total number of training samples in a batch is denoted as N, and L is the dissimilarity measurement which is frequently selected to be cross entropy for classifiers. Aside from these regular terms, we introduce a penalty term $$\sum_{k=1}^{t}\|h_i - h_{i-1}\|,$$

which tries to minimize the difference between the hidden state outputs of each time step. Minimization of the difference restricts the impact brought by one single clock cycle input and prevents the machine learning model from updating its inner feature map too significantly unless the model produces a relatively long sequence of similar patterns. Based on the assumption that malicious behavior happens in multiple sequential cycles instead of just one, an exemplary training scheme enables RNN to take adjacent inputs as groups for gathering information and making decisions. In accordance with various embodiments, and exemplary training procedure is outlined (below) in Algorithm 1.

Algorithm 1 RNN training with Penalty

```
1:   for each iteration of SGD do
2:     σ = 0
3:     for i = 1 to t do
4:       compute adjacent difference Δh = |h_i − h_{i−1}|
5:       σ+ = Δh
6:     end for
7:     Add σ to loss function
8:     Compute gradient of modified loss function
9:     Update parameters by back propagation
10:  end for
```

Once a well-trained model is obtained, an exemplary method can start to perturb the target input x to generate a corresponding perturbed output dataset Y by randomly flipping several bits in the target input x. However, the raw output Y cannot be directly applied to the regression algorithm in the next step due to the fact that random perturbation can generate anomalous data, such as data points with extreme value. These data points are isolated from the others in the cluster so they can introduce a huge deviation in regression algorithms. To address the deviation issue, isolated points in Y can be efficiently removed.

Figure 5:
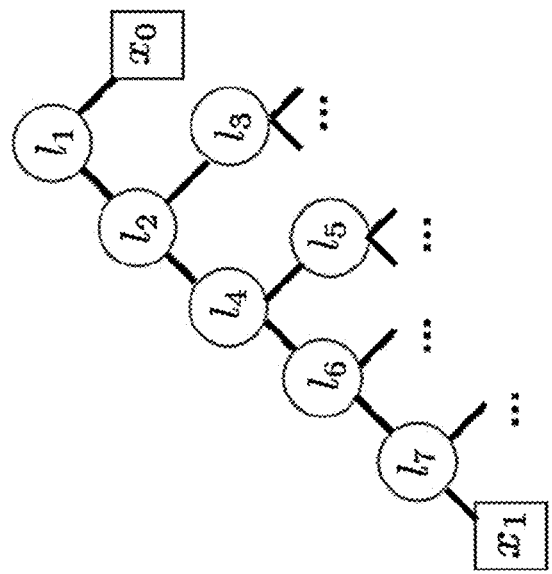
FIG. 5 illustrates a process of finding outliers by cutting a data space in accordance with the present disclosure.
Figure 5:
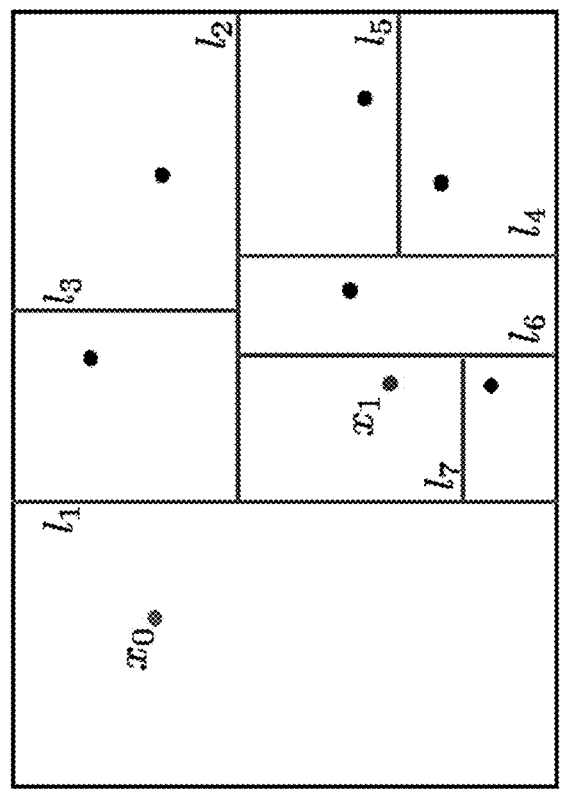

To remove the isolated points, a random voting algorithm is deployed, in various embodiments. The basic idea is to cut a data space with a random hyperplanes, and two subspaces can be generated at a time, as shown in FIG. 5 (left side). An exemplary method continues to randomly select a hyperplane to cut subspaces obtained in the previous step, and the process continues until each subspace contains only one data point. Intuitively, the exemplary method can find that the clusters with high density will not be entirely dismembered until they are cut many times, but those in the low density regions are separated out much earlier. FIG. 5 (right side) demonstrates that the cutting space can also be naively represented by a binary tree. To demonstrate, in FIG. 5, if we wants to isolate $x_0$, we need to draw $l_1$, i.e. cut the space one time, while $x_1$ needs a lot more. So $x_0$ is more likely to be an outlier than $x_1$. In general, a threshold θ is applied to categorize isolated and clustered points. For each data point, the depth of the data point inside the binary tree is checked, such that a point is considered as isolated once the depth exceeds the given threshold. These isolated points are more likely to be extreme value data points and should not be used by the regression algorithm. Eliminating them is likely to improve the accuracy of regression. In order to ensure reliability, this procedure can be repeated several times to obtain a forest of trees, and a voting process performed for the final decision. The pseudocode for an exemplary forest voting algorithm is shown in Algorithm 2 (below).

Algorithm 2 Random Voting Forest

```
Input: Data points set V, threshold θ
1:      procedure TREEBUILDING(V)
2:        root ← V
3:        V_1, V_2 ← bi-sect(V)
4:        if size(V_1) = 1 then return child_1 ← V_1
5:        else child_1 ← TREEBUILDING(V_1)
6:        end if
7:        if size(V_2) = 1 then return child_2 ← V_2
8:        else child_2 ← TREEBUILDING(V_2)
9:        end if
10:       return root
11:     end procedure
12:
13:     procedure FORESTVOTING(θ)
14:       res ← ∅
15:       for each point v in V do
16:         cnt ← 0
17:         for each isolated tree t do
18:           d ← depth of v in t
19:           if d ≥ θ then
20:             cnt ← cnt − 1
21:           else
22:             cnt ← cnt + 1
23:           end if
24:         end for
25:       end for
26:       if cnt ≥ 0 then
27:         res ← res ∪ {v}
28:       end if
29:       return res
30:     end procedure
```

A linear regression algorithm allows a locally nonlinear relationship to be approximated with proper precision. Formally, given a data set $\{y, x_1, x_2, \ldots, x_n\}$, where n is the number of samples, linear regression takes the following form by appending error variable $\epsilon$:

$$y = \sum_{i=1}^{n} a_i x_i + \epsilon$$

where $a_i$s are model parameters, and the goal is to minimize $\epsilon$ as much as possible. The simplest scenario occurs when y and every $x_i$ are real numbers. In the present case, the input is the ω*d trace table X as mentioned before. Since each column of the trace table is treated as an individual input feature, $X=[x_1 \ x_2 \ldots x_d]$, where each $x_i$ is a vector in the size of ω*1. The present disclosure chooses y as the output of the last hidden state, i.e. $h_t$ in FIG. 4 which is also a ω*1 vector, which leads to an optimization problem:

$$\underset{a}{\operatorname{argmin}} \|Xa - y\|_2$$

where $a \in \mathbb{R}^d$ is $[a_1 \ a_2 \ldots a_d]^T$, i.e., coefficients to be solved. This is a common convex optimization problem and its solution can be obtained by least squares which gives $$a = (X^T X)^{-1} X^T y.$$

Unfortunately, the least squares method cannot be directly applied to solve a task associated with exemplary systems and methods of the present disclosure. First, this theoretical solution exists only when $X^T X$ is invertible (full rank), which is not satisfied for most of the time. Second, even when $X^T X$ is full rank, linear regression assumes input vectors are independent, otherwise linear regression will produce unreliable results when any two of $x_i$ (columns) are highly correlated. Specifically, the present disclosure assumes that the regression function is computed to be $\hat{y}=ax_1+bx_2+cx_3+d$, where $x_1$ and $x_2$ are highly related features and they are very close to each other which results in a canceling effect between a and b. Increasing a by a certain amount while decreasing b by the same amount at the same time will not lead to drastic change in $\hat{y}$ and can cause a high variance of computation results for coefficients. The problem becomes ill-posed, since an absolute value of a and b can vary significantly under different computing procedure or initial conditions. Subsequently, the comparison between |a|, |b|, and |c| is not useful; therefore, the interpretability of the model is greatly reduced. Since adjacent columns in a trace table are sequential records of signal values within a short duration, violation of this independence assumption is likely to happen.

In various embodiments of the present disclosure, ridge regression is applied, in which ridge regression is an improved least squares estimation method, and the fitness of correlated data is stronger than general regression. Ridge regression is achieved by appending one extra penalty term to the optimization problem:

$$\underset{a}{\operatorname{argmin}} \|Xa - y\|_2 + \lambda \|a\|_2$$

Intuitively, a size constraint is imposed to restrict the absolute value of all coefficients, which alleviates the problem of high variance of coefficients. Replacing X with X−λI is a general way to avoid the problem for X being a singular matrix:

$$\underset{a}{\operatorname{argmin}} \|Xa - y\|_2 + \lambda \|a\|_2 \rightarrow \underset{a}{\operatorname{argmin}} \|(X - \lambda I)a - y\|_2.$$

Also, this allows for data to be centralized and the problem of high variance to be alleviated. Therefore, with ridge regression, the coefficients of regression that are obtained are more reliable and fit better for our dataset, which has a high correlation.

Once the coefficients of regression are obtained, the importance ranking can be derived and interpreted into meaningful information in the context of malware detection, in which the top features come with large coefficients that are likely to be related to the malicious behavior. Next, an exemplary method checks the clock cycle distribution of these top features which can provide extra information about the malware. For example, if we observe an adjacent cluster of top features, then the time slot within which they reside shall provide a general indication of time information about when malicious behavior happened. Similarly, if clock cycle numbers are periodically separated, the detected malware is likely to repeat its malicious activity periodically. Typical malware behavior usually works in a client-server mode, where a client program steals private data and sends a message to the hacker's server in a periodic interval. For a closer look, an exemplary method can split the trace table into rows and go through the same process, which can lead to identification of trace signal values that are most likely relevant to the malicious behavior and lead to malware localization.

Figure 6:
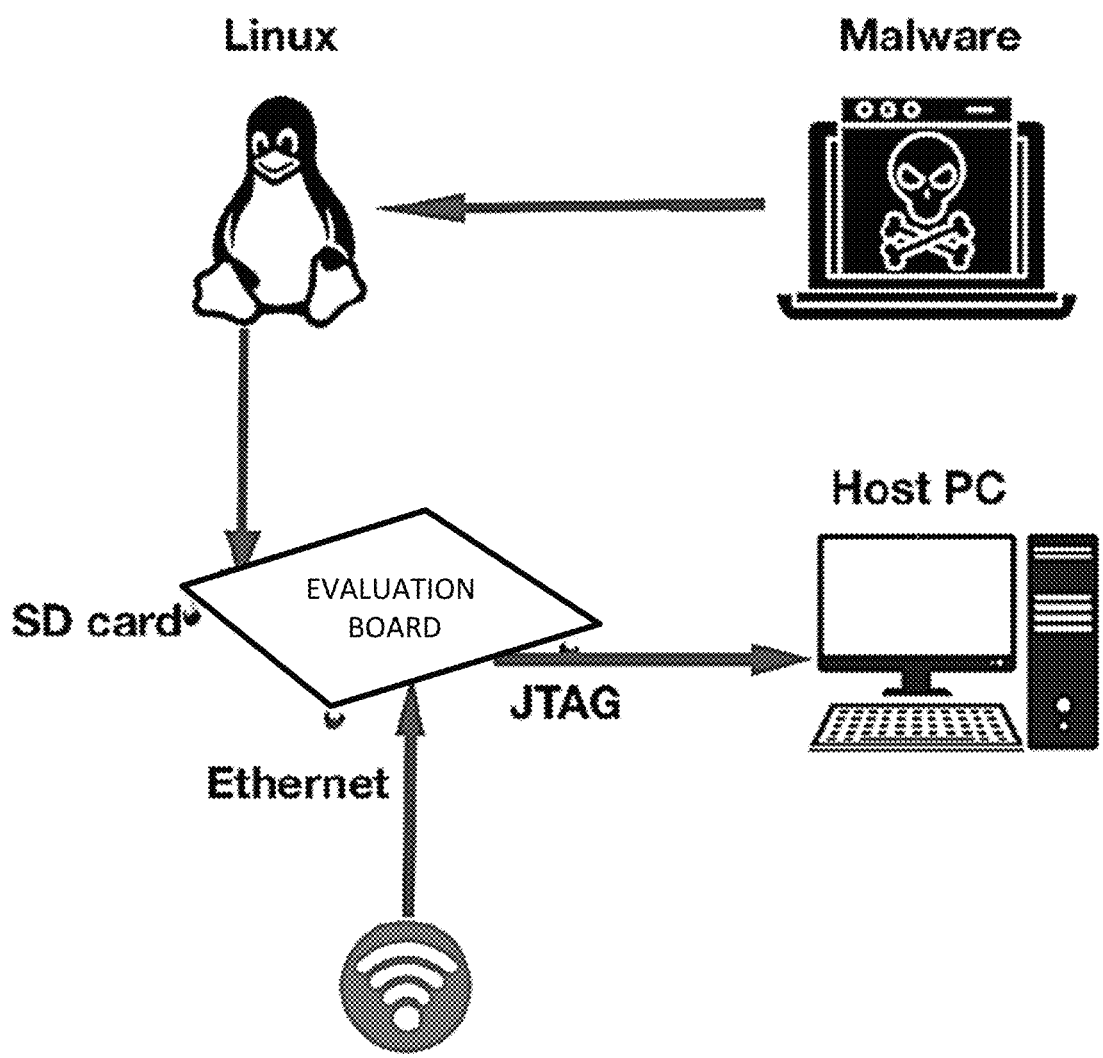
FIG. 6 shows an exemplary platform layout in accordance with the present disclosure.

For experimental evaluation purposes, malicious and benign programs were executed on an Xilinx Zynq-7000 SoC ZC702 evaluation board. The evaluation board integrates double ARM Cortex-A9 cores. Xilinx—zc702—2017_3:4:9:0—xilinx—v2017:3, a Linux kernel image for the ZC702 evaluation board generated using PetaLinux, was installed to the evaluation board using the provided 8 GB SD Card. To view the contents of internal signal values, the evaluation board was linked to the System Debugger in Xilinx SDK version 2017.3, which uses a hardware server to allow for compilation and execution of the programs on the board while monitoring traced signal values. An exemplary configuration of the experimental platform (as shown in FIG. 6) involves connecting the board to a host computer running Xilinx SDK using Ethernet (to run programs using the System Debugger) and JTAG (to dump register data provided by the SDK and set up the Ethernet connection).

As part of the experimental evaluation, a wide variety of malware families are considered including the following three popular ones: BASHLITE Botnet, PNScan Trojan, and Mirai Botnet. BASHLITE, also known as Gafgyt or Lizard-Stresster, is a malware family targeting Linux systems. BASHLITE infiltrates IoT devices and these poisoned devices are used to manipulate largescale distributed denial-of-service (DDoS) attacks. BASHLITE uses Shellshock to gain a foothold on vulnerable devices, then remotely executes commands to launch DDOS attacks and download other files to the compromised device. BASHLITE works in a client-server mode where poisoned devices keep sending requests to a remote server checking for possible update releases or malicious requests.

PNScan is an open source Linux Trojan which can infect devices with ARM, MIPS, and PowerPC architectures. The PNScan Trojan or applications with the PNScan Trojan embedded can invade network devices. The PNScan malicious program has only one goal—obtain the router's access password through brute force. If the intrusion is successful, the Trojan will load a malicious script into the router which will download the corresponding backdoor program according to the router's system architecture.

Mirai is an upgraded variant of BASHLITE. Mirai can efficiently scan IoT devices and infect fragile devices like the ones encrypted with default factory settings or weak passwords. After being infected by the Mirai malware, the device becomes a botnet robot and launches a high-intensity botnet attack under the command of a hacker.

Benign programs used in the experimental evaluation include system binaries such as ls,mkdir,ping,netstat. The traced values gathered by running both malware and benign programs on the hardware board are utilized as inputs to an exemplary classifier.

Figure 7:
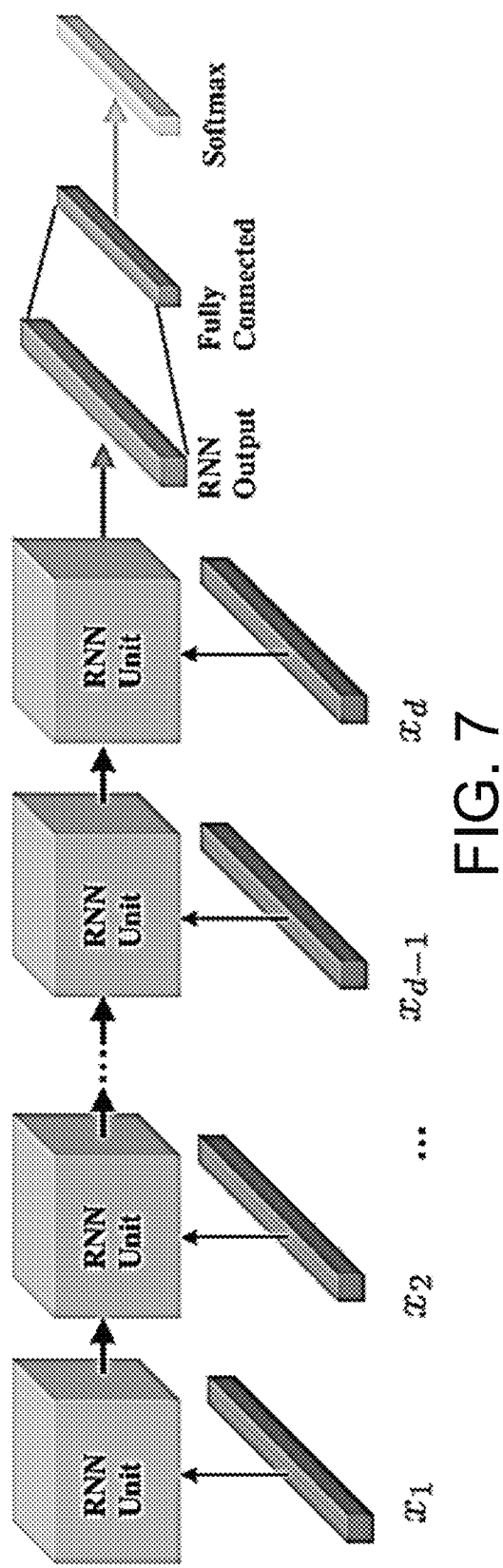
FIG. 7 shows an exemplary classifier architecture in accordance with embodiments of the present disclosure.

FIG. 7 presents the architecture of an exemplary RNN-classifier that utilizes the structure outlined in FIG. 4. Here $\{x_1, x_2, \ldots, x_d\}$ are values of traced signals in d different clock cycles. After passing through RNN units, the outputs are fed into a fully connected layer to achieve dimension reduction. Finally, a Softmax layer takes the reduced outputs from the fully connected layer to produce classification labels. As for RNN units, there are three most widely-applied prototypes: traditional (also known as vanilla units), GRU (Gated Recurrent Unit), and LSTM (Long Short-Term Memory). For experimental evaluation purposes, GRU is applied and the reason for making this choice is threefold.

First, traditional units suffer from a vanishing gradient and an exploding gradient problem. Traditional RNN units usually contains an extremely long chain of RNN units for handling a complicated task. When performing back-propagation, if the initial gradient is less than 1, the gradient at the last moment will disappear and vice versa. Both situations will lead to failure in the training process.

Second, LSTM (long-short term memory) adopted a gate mechanism to solve the vanishing gradient problem. Meanwhile, the gate mechanism provides feature filtering, saving useful features, and discarding useless features, which greatly enrich the information representation capacity of the model. However, LSTM suffers from a high computation time cost, which is the key barrier for it to be adopted in the present study, since a low-latency malware detection technique is desired.

Third, a GRU (Gated Recurrent Unit) also utilizes a gate mechanism to solve the gradient-related problems and can be regarded as a simplified version of LSTM. By merging overlapped gates and hidden states, the model structure is much simpler than LSTM. Simpler structure brings fewer parameters and faster convergence. GRU takes much less time, which can greatly speed up the training process.

For evaluation purposes, the accuracy of an exemplary hardware-assisted malware detection approach is compared with the state-of-the-art hardware-assisted malware detector, PREEMPT. PREEMPT utilizes an embedded trace buffer to help reducing latency and overcoming malware equipped with obfuscation. PREEMPT utilizes two types of implementation, random forest (PREEMPT RF) and decision tree (PREEMPT DT).

To do so, both malicious and benign software are executed on an exemplary hardware platform, in which a total of 367 programs (including both malicious and benign ones) are executed. All the traced data were mixed up and further split into training (80%) and test (20%) sets after labeling. Total training epochs are 200 for every model and test accuracy was plotted every 10 epochs.

Figure 8A:
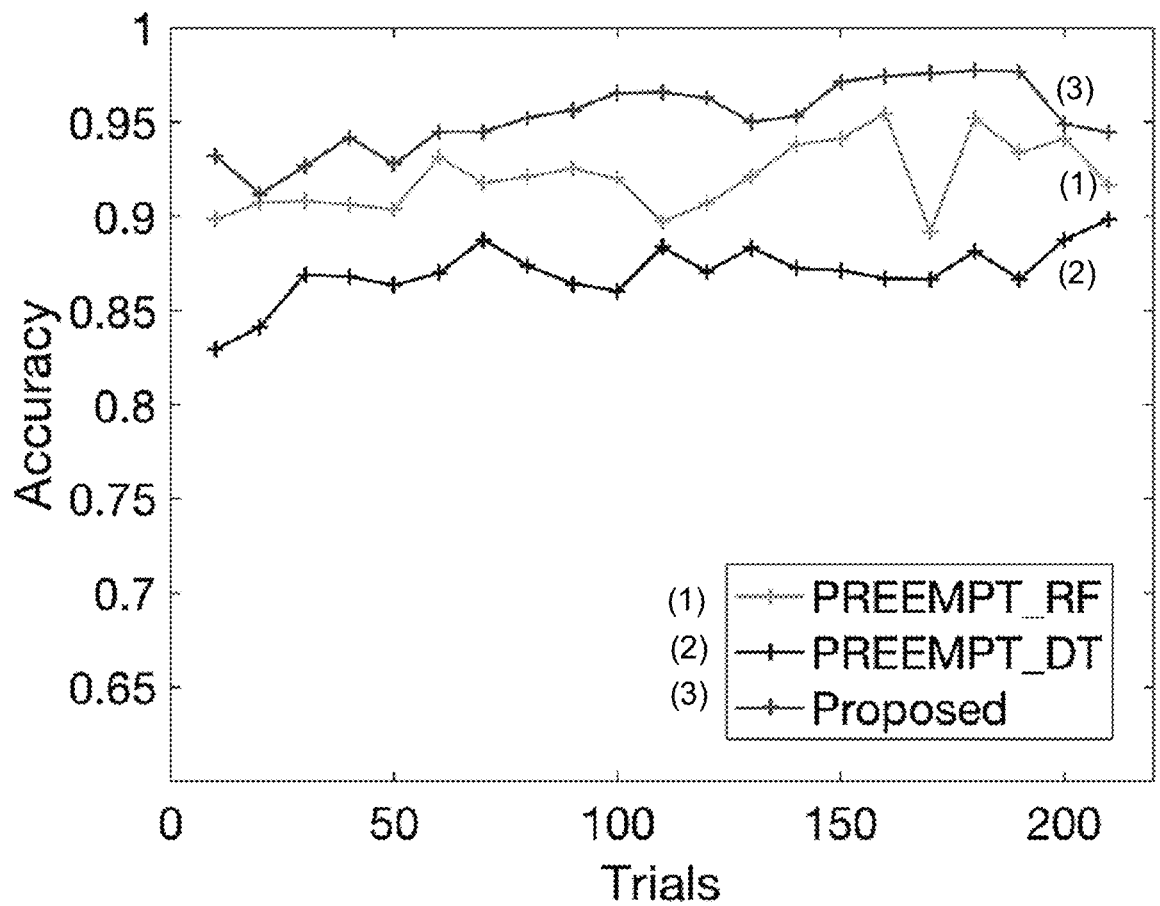
FIGS. 8A, 8B, 8C, and 8D show performance plots of machine learning models for various malware programs (A-C) and for benign benchmarks (D) with respect to an exemplary hardware-assisted malware detection of an embodiment of the present disclosure versus state-of-the-art hardware-assisted malware detectors.
Figure 8B:
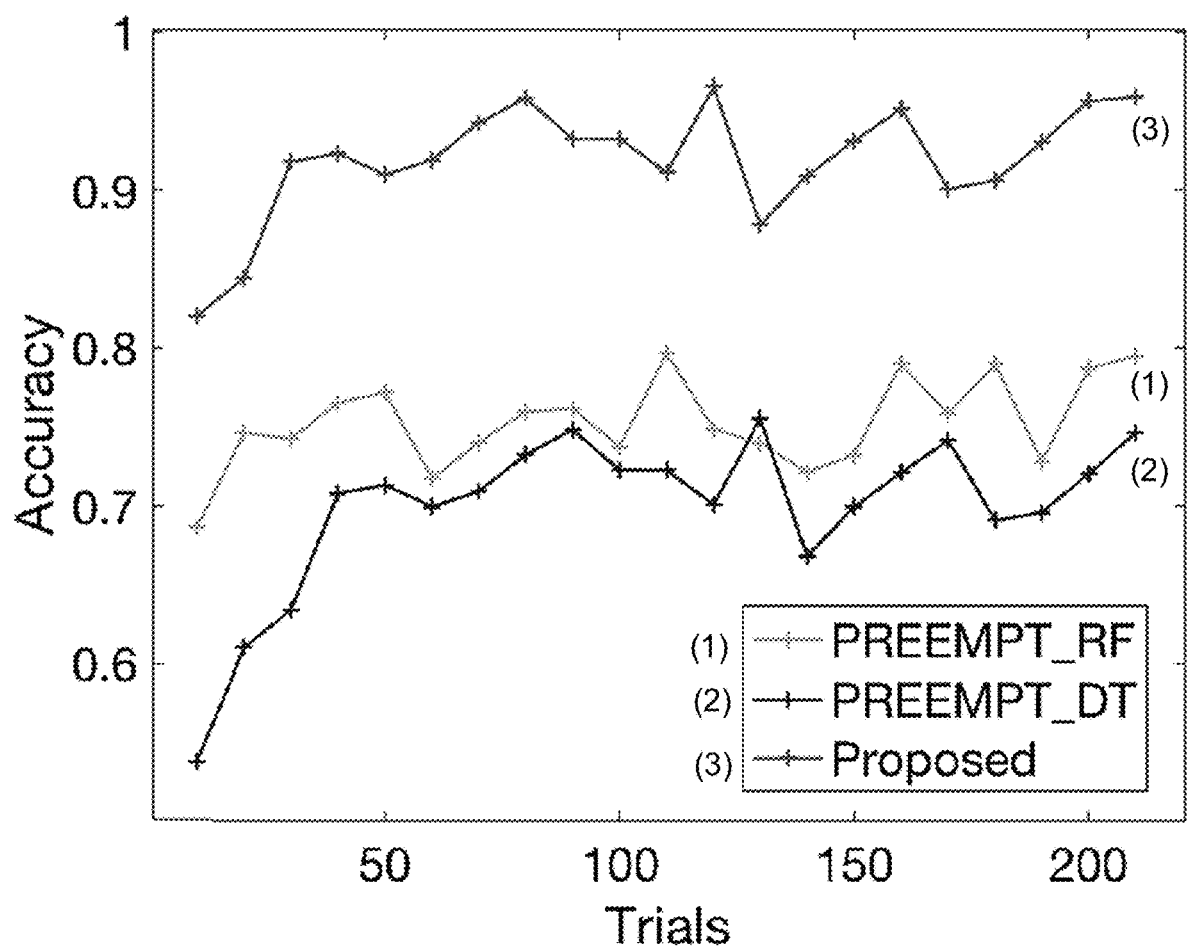
Figure 8C:
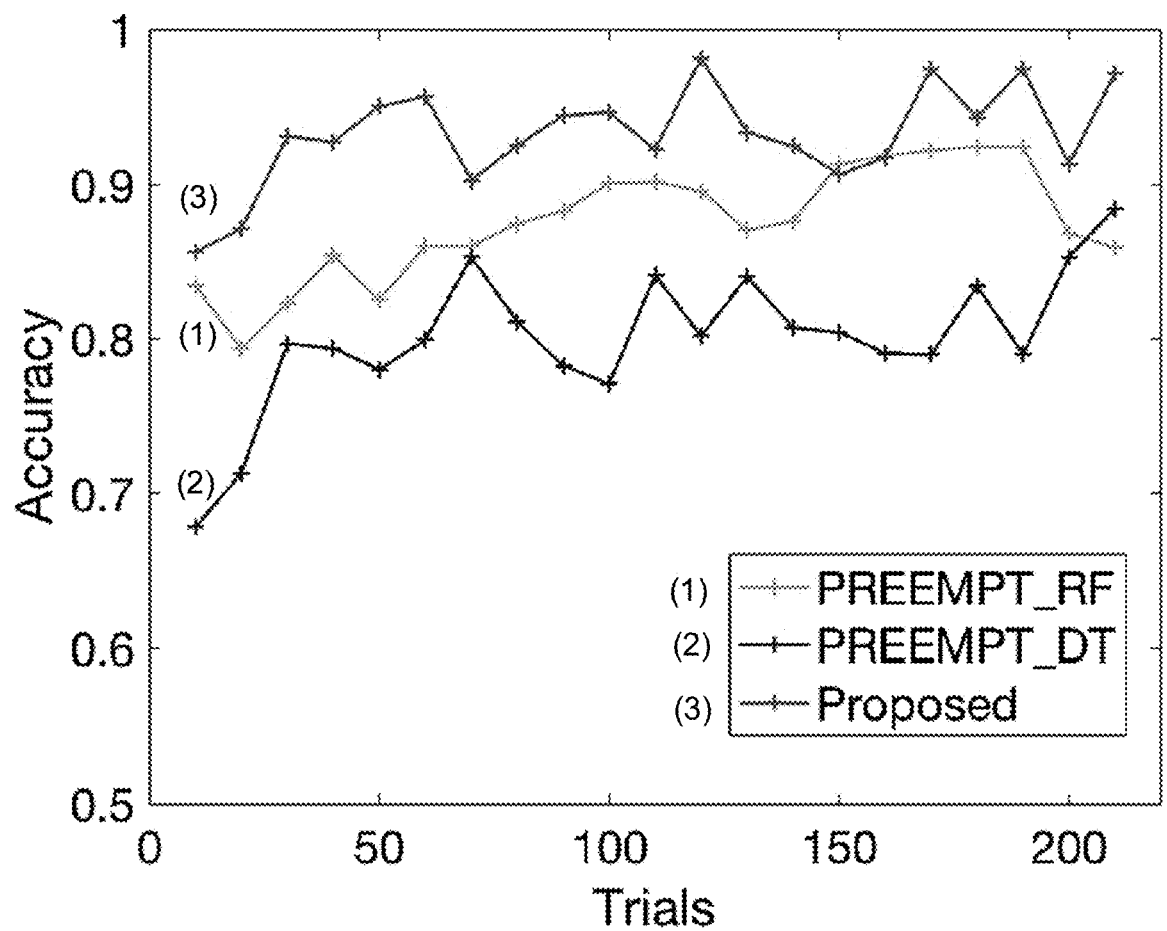

Accordingly, FIGS. 8A-8C compares the prediction accuracy of an exemplary hardware-assisted malware detection approach with PREEMPT RF and PREEMPT DT. As we can see, the exemplary method (referred to as "proposed" in the figures) provides the best malware detection accuracy. For example, the PREEMPT appeared fragile in the face of PNScan, with an average of 62.7% accuracy for DT and 76.9% for RF, while the exemplary method provided an average accuracy as high as 91.4%. For BASHLITE, both the exemplary method and RF performed well and the result accuracy of the exemplary method is 98.9%. For Mirai, the exemplary method achieved 97.5% accuracy while PREEMPT attained a maximum accuracy of 92.5% with RF. Note the inferior performance of PREEMPT DT in Mirai dataset.

Figure 8D:
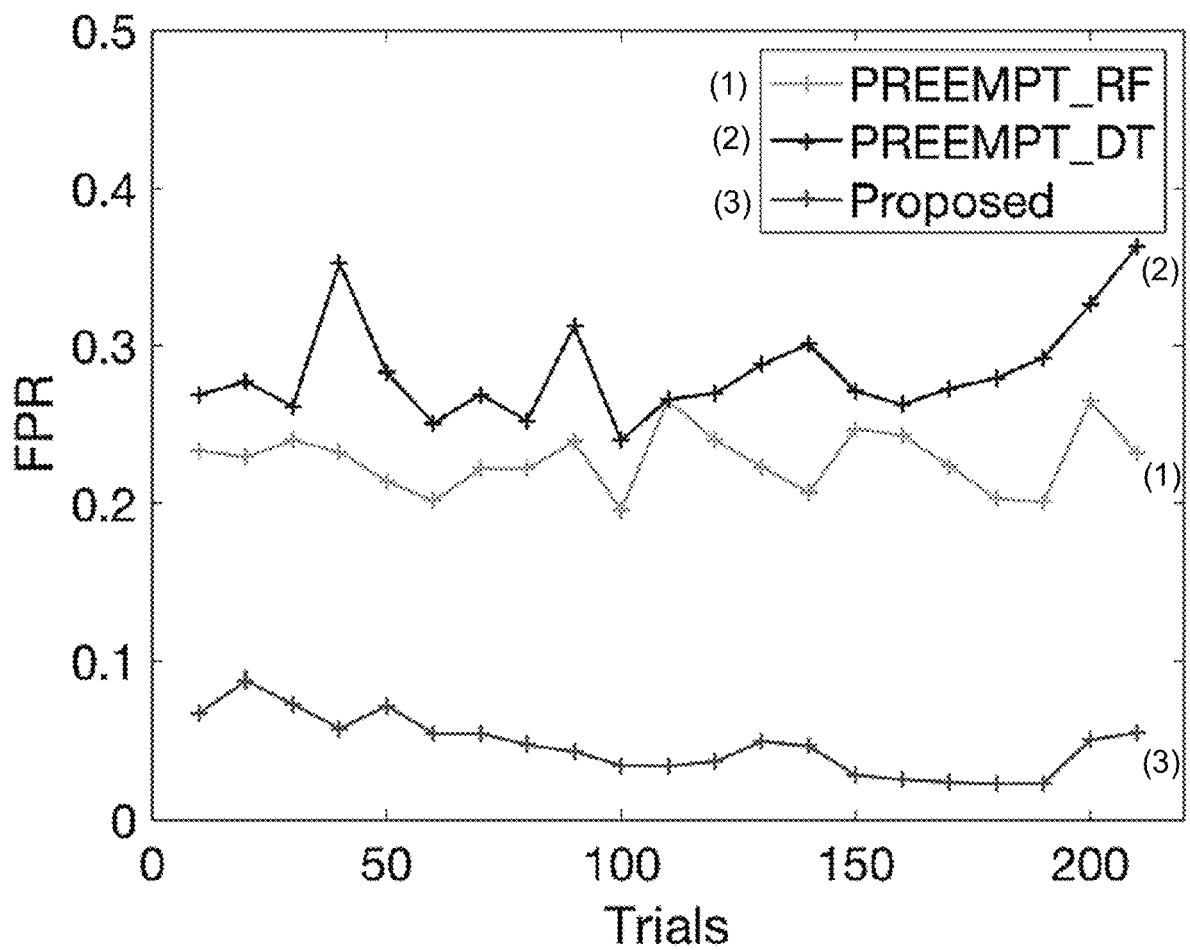

If malware is omitted and models are tested on traced data gathered from benign software only, FIG. 8D shows the false positive rate (FPR) of all three methods. The figure illustrates the major drawback of PREEMPT, as PREEMPT possesses an average FPR as high as 25.9% with RF and 31.6% with DT. In other words, PREEMPT is very likely to mispredict a benign software as malware. Tested benign software samples also executes Linux system binaries like netstat and ping, which are also frequently executed by botnet malware. Since PREEMPT cannot analyze time sequential data, PREEMPT failed to recognize benign execution of these binaries with the help of context and produced wrong predictions. In contrast, an exemplary framework/method of the present disclosure obtained FPR as low as 3.4%.

To evaluate outcome interpretation, the performance of the exemplary method is assessed by interpreting the contribution factor for the classification results. For clock-cycle related analysis, an example of executing BASHLITE's client on host machine is shown in FIG. 9. The figure shows a snapshot of the trace table, where each row represents the values in a register in specific clock cycles (each column represents a specific clock cycle). The exemplary method computed the corresponding contribution factor of each clock cycle towards the RNN output using linear regression, which is shown as weights in the last row. As we can see, the weight of $C_4$ is significantly larger than the others, which immediately indicates the clock cycle of malicious behavior. By tracing the execution, it is observed that $C_4$ points to the timestamp before the start of function "processCmd" in BASHLITE, which is the most important function of BASHLITE to perform its malicious functionality. In other words, this is the starting point and exact reason for recognizing the BASHLITE program as malware.

Figure 10:
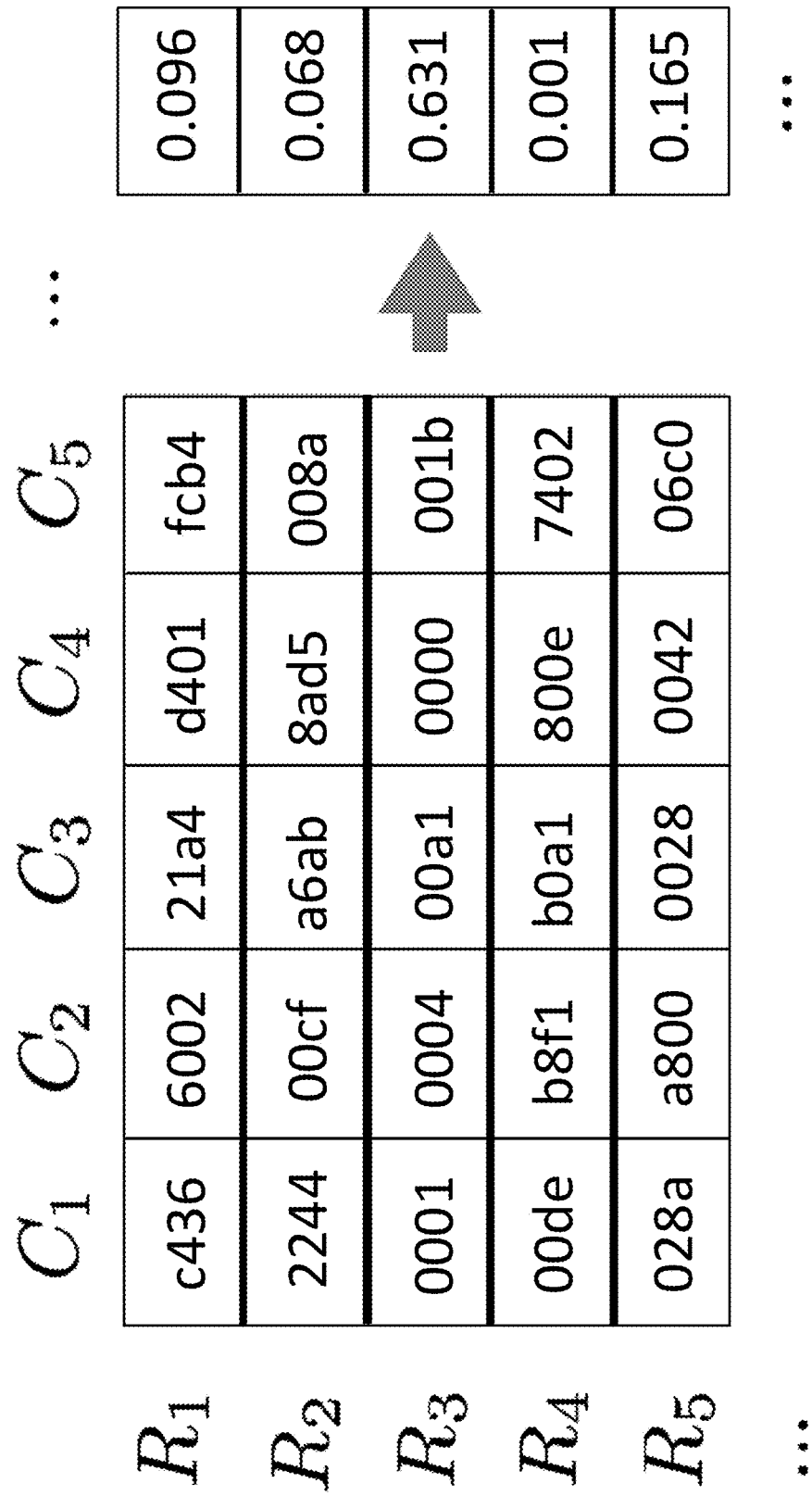
FIG. 10 illustrates an interpretation of Mirai bot's traced signals that indicate a clock cycle of malicious behavior in accordance with the present disclosure.

Another example of outcome interpretation is shown in FIG. 10, where the contribution of each traced register signal is measured. The figure shows the trace table of executing Mirai's bot on host machine, where each row represents the values in a register in specific clock cycles and each column represents a specific clock cycle. This time the contribution is evaluated row-by-row, and the result is listed on the right side of the trace table. As we can see, register $R_3$ is recognized as the most important factor. Here $R_3$ is storing the variable "ATTACK VECTOR" in Mirai, in which this variable records the identity of attack modes, based on which the bot takes relative actions to perform either a UDP (User Datagram Protocol) attack or a DNS (Doman Name System) attack. This attack-mode flag is the most important feature of a majority of malware bot programs, in which the exemplary method is equipped to successfully extract the attack-mode flag from the traces to illustrate the reason for making the corresponding prediction.

In accordance with the present disclosure, a designer can choose a variety of possible implementations for the technology of the present disclosure based on a target system and other design constraints. For example, this technology can be potentially implemented using a wide variety of options including Central Processing Unit (CPU), FPGA (Field Programmable Gate Array), Graphics Processing Unit (GPU), Tensor Processing Unit (TPU), and Application Specific Integrated Circuit (ASIC). Implementation flexibility broadens the potential use of the technology. The GPU and CPU options rely on software-based implementation of the technology. The other three options are hardware-based implementation of the technology. Note that in all of these cases the input data remains the same—hardware performance counters as well as trace data from the device that is running a specific program that is being evaluated and labeled as malware or a benign program.

CPU-based Implementation is one of the available implementations. For example, the data recited herein for the present disclosure was generated using a CPU-based implementation, in which trace data was dumped from a host CPU for analysis, the explainable machine learning model was written in Python, and software was executed on the CPU-based implementation. Such CPU-based implementations have a flexible choice of operating systems and machine learning libraries.

GPU-based Implementation is another one of the available implementations and is similar to the CPU-based implementation except that an exemplary algorithm needs to be developed using a CUDA (Compute Unified Device Architecture) programming environment and executed using GPUs. Such GPU-based implementations are likely to provide better performance than the CPU-based implementation because GPUs efficiently handle multiple tasks in parallel.

For a FPGA-based implementation, an exemplary algorithm can be implemented using any hardware description language (e.g., Verilog or VHDL) and mapped to the FPGA using design automation software. Trace data will need to be provided as well as performance counter values to the FPGA. Such FPGA-based implementations are expected to perform significantly faster than both CPU- and GPU-based implementations.

A TPU-based implementation utilizes a Tensor Processing Unit (TPU), which is Google's domain-specific hardware for accelerating the computation process of deep learning models. To implement Algorithm 1, TPU is compatible with the TensorFlow library for implementing machine learning process, where the neural network can be encoded as matrices and the forward pass can be interpreted as sequential matrix multiplications. Meanwhile, the storage unit in TPU can be utilized to encode the voting tree for Algorithm 2. For large-scale machine learning models, the entire framework can be distributed across various TPU cores, where the communication among cores can be implemented by TPU's built-in command tf.cross_replica_sum. Such TPU-based implementations are expected to perform even better than a FPGA-based implementation.

Next for an ASIC implementation, an exemplary algorithm is implemented using an Application Specification Integrated Circuit (ASIC), which can provide possibly the best possible performance for a specific malware detection scenario by using Verilog or VHDL (Very high speed integrated circuit Hardware Description Language) to describe the forward pass and back propagation computation. While ASIC-based implementation is expected to provide the best possible design in terms of power and performance, it has two limitations: (1) ASIC does not provide the programmability/reconfigurability provided by other approaches; and (2) ASIC incurs higher cost and development time to design, fabricate, and test the ASIC design compared to the other approaches.

In brief, recent high-profile malware attacks coupled with serious economic implications have dramatically changed the perception of threats from malware. Existing software-based solutions are not effective in the face of malware with obfuscation or other deviation capabilities. While recent hardware-assisted malware detection methods provide promising results, state-of-the-art hardware-assisted detection methods have several limitations including limited prediction accuracy and lack of transparency. In accordance with embodiments of the present disclosure, an exemplary hardware-assisted malware detection approach addresses these limitations by developing a regression-based explainable machine learning algorithm. In the present disclosure, an exemplary machine learning model is enabled to make decisions utilizing potential information concealed in consecutive adjacent inputs, which is achieved by a recurrent neural network with a special penalty term. In accordance with embodiments of the present disclosure, an exemplary hardware-assisted malware detection approach is able to find the major contributors among all input features by perturbation and linear regression. Experimental results demonstrated that such an approach significantly outperforms (with average accuracy of 98.9%) state-of-the-art approaches on three most popular malware families. Unlike existing approaches, an exemplary hardware-assisted malware detection approach provided transparency in prediction results, which is vital for outcome interpretation as well as malware localization.

Figure 11:
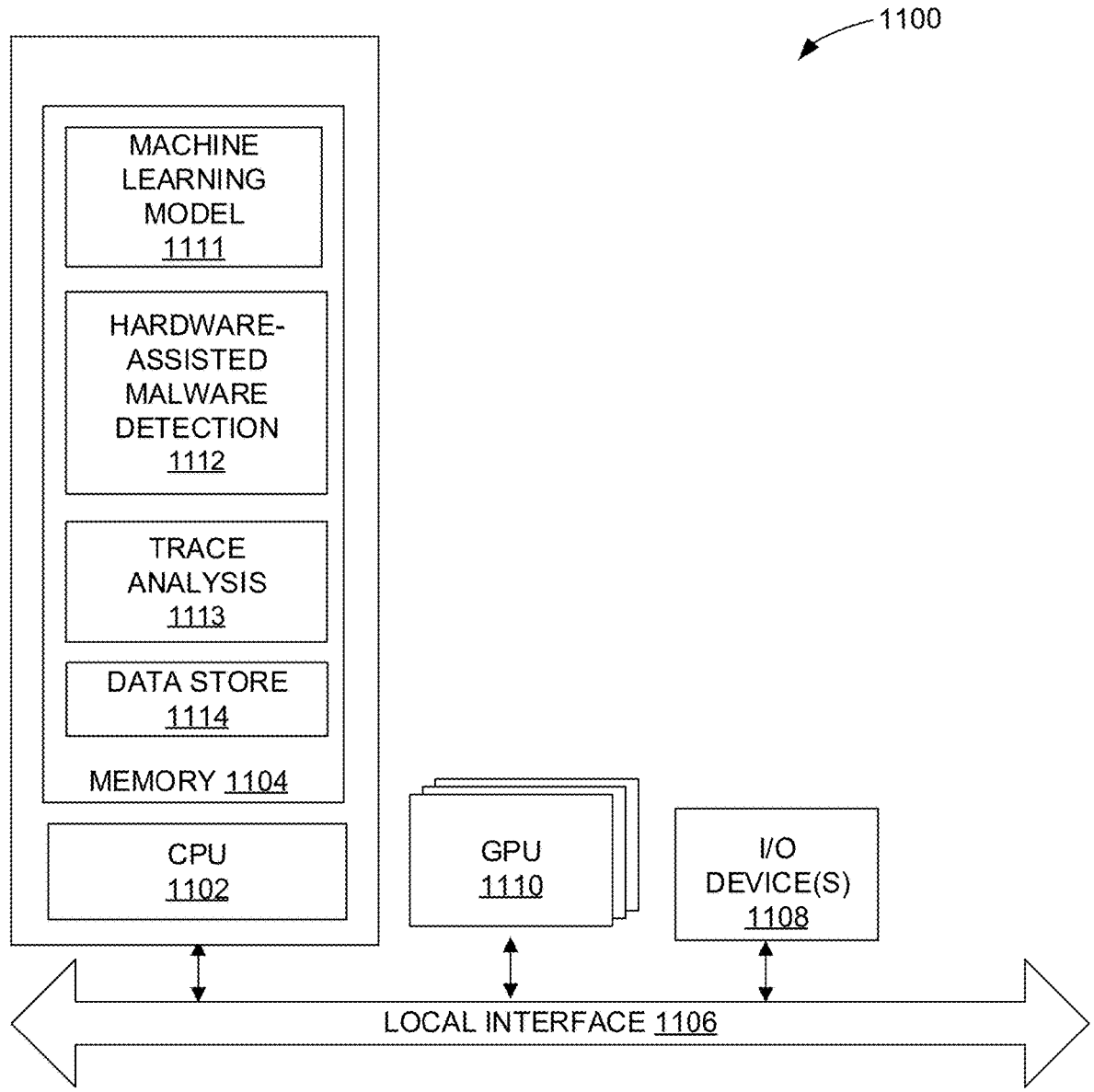
FIG. 11 depicts a schematic block diagram of a computing device that can be used to implement various embodiments of the present disclosure.

FIG. 11 depicts a schematic block diagram of a computing device 1100 that can be used to implement various embodiments of the present disclosure. An exemplary computing device 1100 includes at least one processor circuit, for example, having a processor 1102 and a memory 1104, both of which are coupled to a local interface 1106, and one or more input and output (I/O) devices 1108. The local interface 1106 may comprise, for example, a data bus with an accompanying address/control bus or other bus structure as can be appreciated. The CPU can perform various operations including any of the various operations described herein.

Stored in the memory 1104 are both data and several components that are executable by the processor 1102. In particular, stored in the memory 1104 and executable by the processor 1102 is a machine learning model 1111 (e.g., a Recurrent Neural Network), a hardware-assisted malware detection routine 1112, trace analysis program 1113, and/or related programs, in accordance with embodiments of the present disclosure. Also stored in the memory 1104 may be a data store 1114 and other data. The data store 1114 can include time-sequential input data, trace data, and potentially other data. In addition, an operating system may be stored in the memory 1104 and executable by the processor 1102. The I/O devices 1108 may include input devices, for example but not limited to, a keyboard, touchscreen, mouse, recording devices, and/or sensors, etc. Furthermore, the I/O devices 1108 may also include output devices, for example but not limited to, a display, speaker, earbuds, audio output port, a printer, etc.

Certain embodiments of the present disclosure can be implemented in hardware, software, firmware, or a combination thereof. If implemented in software, hardware-assisted malware detection logic or functionality; in accordance with embodiments of the present disclosure, are implemented in software or firmware that is stored in a memory and that is executed by a suitable instruction execution system. If implemented in hardware, the hardware-assisted malware detection logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Contributions provided by the present disclosure include that the disclosed approaches are the first attempt in developing hardware-assisted malware detection using explainable machine learning, which leads to interpretable detection results as well as improved accuracy compared to the state-of-the-art methods; the interpretable detection results shed light on why the classifier makes incorrect decisions, which leads to malware localization; and experimental evaluations using an SoC board running real-world malware benchmarks demonstrate the effectiveness of the disclosed approaches in accurate classification of benign and malicious programs, along with useful interpretation of detection results.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present Therefore, at least the following is claimed:

1. A malware detection system comprising:
a memory; and
a hardware processor of a computing device operatively coupled to the memory, the hardware processor configured to:
execute a software application suspected of being malware;
monitor behavior of the software application at run-time over a plurality of data cycles;
acquire an input time sequence of data records based on a trace analysis of the software application, wherein the input time sequence comprises a plurality of features of the software application;
classify the software application as being a malicious software application based on the plurality of features of the software application;
select a subset of the plurality of features that contributed towards the classification of the software application as being a malicious software application;
generate a ranking of the subset of the plurality of features by their respective contributions towards the classification of the software application as being a malicious software application;
perform outlier elimination for improved classification of the software application as being a malicious software application; and
output the classification of the software application and the ranking of the subset of the plurality of features.

2. The system of claim 1, wherein the hardware processor uses a recurrent neural network model to classify the software application and rank the subset of the plurality of features.

3. The system of claim 2, wherein the recurrent neural network is composed of Gated Recurrent Units.

4. The system of claim 1, wherein the selection of the subset of the plurality of features is performed by perturbing an individual input time sequence and observing a change in output of the individual input time sequence.

5. The system of claim 1, wherein the hardware processor is further configured to output an indication of time information about when malicious behavior happened within execution of the software application.

6. The system of claim 1, wherein the input time sequence comprises processor register values at respective clock cycles.

7. The system of claim 6, wherein the hardware processor is further configured to format the input time sequence in a $\omega \times d$ table, where $\omega$ is a respective processor register value and d is a respective clock cycle, wherein each column of the table forms an individual feature of the plurality of features.

8. The system of claim 6, wherein the hardware processor is further configured to format the input time sequence in a $\omega \times d$ table, where $\omega$ is a respective processor register value and d is a respective clock cycle, wherein each row of the table forms an individual feature of the plurality of features.

9. The system of claim 1, wherein the hardware processor is further configured to:
execute a second software application;
monitor behavior of the second software application at run-time over a plurality of data cycles;
acquire a second input time sequence of data records based on a trace analysis of the second software application, wherein the second input time sequence comprises a plurality of features of the second software application; and
classify the second software application as being benign based on the plurality of features of the second software application.

10. The system of claim 1, further comprising at least one hardware module, wherein the at least one hardware module comprises a hardware performance counter or a design-for-debug structure that assists in the trace analysis of the software application.

11. A malware detection method comprising:
executing, by a computing device, a software application suspected of being malware;
monitoring, by the computing device, behavior of the software application at run-time over a plurality of data cycles;
acquiring, by the computing device, an input time sequence of data records based on a trace analysis of the software application, wherein the input time sequence comprises a plurality of features of the software application;
classifying, by the computing device, the software application as being a malicious software application based on the plurality of features of the software application;
selecting, by the computing device, a subset of the plurality of features that contributed towards the classification of the software application as being a malicious software application;
generating, by the computing device, a ranking of the subset of the plurality of features by their respective contributions towards the classification of the software application as being a malicious software application;
performing, by the computing device, outlier elimination for improved classification of the software application as being a malicious software application; and
outputting, by the computing device, the classification of the software application and the ranking of the subset of the plurality of features.

12. The method of claim 11, wherein a recurrent neural network model is used by the computing device to classify the software application and rank the subset of the plurality of features.

13. The method of claim 11, wherein the selection of the subset of the plurality of features is performed by perturbing an individual input time sequence and observing a change in output of the individual input time sequence.

14. The method of claim 11, further comprising outputting, by the computing device, an indication of time information about when malicious behavior happened within execution of the software application.

15. The method of claim 11, wherein the input time sequence comprises register values of a processor of the computing device at respective clock cycles.

16. The method of claim 15, further comprising formatting, by the computing device, the input time sequence in a $\omega \times d$ table, where $\omega$ is a respective register value and d is a respective clock cycle, wherein each column of the table forms an individual feature of the plurality of features.

17. The method of claim 15, further comprising formatting, by the computing device, the input time sequence in a $\omega \times d$ table, where $\omega$ is a respective processor register value and d is a respective clock cycle, wherein each row of the table forms an individual feature of the plurality of features.

18. The method of claim 11, further comprising:
executing, by the computing device, a second software application;

monitoring, by the computing device, behavior of the second software application at run-time over a plurality of data cycles;

acquiring, by the computing device, a second input time sequence of data records based on a trace analysis of the second software application, wherein the second input time sequence comprises a plurality of features of the second software application; and classifying, by the computing device, the second software application as being benign based on the plurality of features of the second software application.

19. A non-transitory computer readable storage medium having instructions stored thereon that, in response to execution by a computing device, cause the computing device to perform operations comprising:

executing a software application suspected of being malware;

monitoring behavior of the software application at run-time over a plurality of data cycles;

acquiring an input time sequence of data records based on a trace analysis of the software application, wherein the input time sequence comprises a plurality of features of the software application;

classifying the software application as being a malicious software application based on the plurality of features of the software application;

selecting a subset of the plurality of features that contributed towards the classification of the software application as being a malicious software application;

generating a ranking of the subset of the plurality of features by their respective contributions towards the classification of the software application as being a malicious software application;

performing outlier elimination for improved classification of the software application as being a malicious software application; and outputting the classification of the software application and the ranking of the subset of the plurality of features.

20. The non-transitory computer readable storage medium of claim 19, wherein the operations further comprise:

executing a second software application;

monitoring behavior of the second software application at run-time over a plurality of data cycles;

acquiring a second input time sequence of data records based on a trace analysis of the second software application, wherein the second input time sequence comprises a plurality of features of the second software application; and classifying the second software application as being benign based on the plurality of features of the second software application.

* * * * *